United States Patent
Paradkar et al.

(10) Patent No.: US 11,411,811 B2
(45) Date of Patent: Aug. 9, 2022

(54) FAULT LOCALIZATION FOR CLOUD-NATIVE APPLICATIONS

(71) Applicant: International Business Machines Corporation, Armonk, NY (US)

(72) Inventors: Amitkumar Manoharrao Paradkar, Mohegan Lake, NY (US); Pooja Aggarwal, Bangalore (IN); Atri Mandal, Bangalore (IN); Ajay Gupta, New Delhi (IN)

(73) Assignee: International Business Machines Corporation, Armonk, NY (US)

(*) Notice: Subject to any disclaimer, the term of this patent is extended or adjusted under 35 U.S.C. 154(b) by 0 days.

(21) Appl. No.: 17/000,593

(22) Filed: Aug. 24, 2020

(65) Prior Publication Data

US 2022/0060371 A1 Feb. 24, 2022

(51) Int. Cl.
*H04L 41/0677* (2022.01)
*H04L 41/069* (2022.01)

(52) U.S. Cl.
CPC ........ *H04L 41/0677* (2013.01); *H04L 41/069* (2013.01)

(58) Field of Classification Search
None
See application file for complete search history.

(56) References Cited

U.S. PATENT DOCUMENTS

| | | | | |
|---|---|---|---|---|
| 7,251,584 B1* | 7/2007 | Perazolo | ............... | G06F 11/008 702/182 |
| 7,996,814 B1* | 8/2011 | Qureshi | ................ | G06N 5/048 717/172 |
| 8,001,527 B1* | 8/2011 | Qureshi | ............... | G06F 11/079 717/172 |
| 8,170,975 B1* | 5/2012 | Qureshi | ................ | G06N 5/048 706/45 |

(Continued)

FOREIGN PATENT DOCUMENTS

| | | |
|---|---|---|
| CN | 103617109 A | 3/2014 |
| CN | 107133240 A | 9/2017 |
| CN | 107608860 A | 1/2018 |

OTHER PUBLICATIONS

Mariani et al., Localizing Faults in Cloud Systems, In Int. Conf. on Software Testing, Validation and Verification (ICST), IEEE, Mar. 2018.

(Continued)

*Primary Examiner* — Ranodhi Serrao
(74) *Attorney, Agent, or Firm* — Ryan, Mason & Lewis, LLP

(57) ABSTRACT

Methods, systems, and computer program products for fault localization for cloud-native applications are provided herein. A computer-implemented method includes classifying an event-related alert directed to at least one system by processing one or more characteristics of the event-related alert; obtaining and processing multiple application logs based at least in part on the classification of the event-related (Continued)

alert; identifying error logs among the multiple application logs based at least in part on the processing of the multiple application logs; ordering the error logs using one or more prioritization techniques; and performing at least one automated action based at least in part on the ordering of the error logs.

17 Claims, 10 Drawing Sheets

(56) References Cited

U.S. PATENT DOCUMENTS

| | | | | |
|---|---|---|---|---|
| 8,180,724 | B1* | 5/2012 | Qureshi | G06N 5/048 |
| | | | | 706/50 |
| 8,589,727 | B1* | 11/2013 | Fletcher | G06F 11/202 |
| | | | | 714/13 |
| 9,384,112 | B2* | 7/2016 | Petersen | G06F 11/327 |
| 9,674,287 | B2* | 6/2017 | Ladd | H04L 67/16 |
| 10,419,469 | B1* | 9/2019 | Singh | G06F 16/9024 |
| 10,452,992 | B2* | 10/2019 | Lee | G06N 20/00 |
| 10,810,074 | B2* | 10/2020 | Yu | G06F 11/3075 |
| 2004/0138858 | A1* | 7/2004 | Carley | H04L 41/22 |
| | | | | 702/186 |
| 2004/0250171 | A1 | 12/2004 | Norman | |
| 2006/0002532 | A1* | 1/2006 | Horvitz | H04M 3/42365 |
| | | | | 379/112.01 |
| 2008/0126878 | A1* | 5/2008 | Best | G06F 11/3636 |
| | | | | 714/45 |
| 2011/0314148 | A1* | 12/2011 | Petersen | G06F 11/3476 |
| | | | | 709/224 |
| 2014/0317459 | A1 | 10/2014 | Frank et al. | |
| 2015/0026335 | A1* | 1/2015 | Ladd | H04L 41/06 |
| | | | | 709/224 |
| 2015/0379429 | A1* | 12/2015 | Lee | G09B 5/00 |
| | | | | 706/11 |
| 2017/0103013 | A1 | 4/2017 | Grechanik | |
| 2020/0012549 | A1 | 1/2020 | Johnsson et al. | |

OTHER PUBLICATIONS

Weng et al., Root Cause Analysis of Anomalies of Multitier Services in Public Clouds, IEEE/ACM Transactions on Networking, vol. 26, Issue: 4, 2018.

Zhou et al., Latent error prediction and fault localization for microservice applications by learning from system trace logs. Proceedings of the ACM Joint Meeting on European Software Engineering Conference and Symposium on the Foundations of Software Engineering, Aug. 2019.

Nguyen et al., "FChain: Toward Black-Box Online Fault Localization for Cloud Systems," 2013 IEEE 33rd International Conference on Distributed Computing Systems, 2013, pp. 21-30.

Peter Mell, et al. The NIST Definition of Cloud Computing, Recommendations of the National Institute of Standards and Technology, US Department of Commerce, Special Publicaiton 800-145, Sep. 2011, pp. 1-7.

Nandi et al., Anomaly detection using program control flow graph mining from execution logs, KDD '16, Aug. 2016.

International Search Report dated Oct. 14, 2021.

* cited by examiner

```
{
  "component": "dialog",
  "@timestamp": "2019-11-20T15:33:00.000Z",
  "pod": "pm8976bg-9jkoi",
  "namespace": "conversation",
  "container": "dialog",
  "containerid": "2345ght",
  "node": "kube-n0977",
  "text": "SpelEvaluationException"
  "level": "WARN"
}
```

FAULT LOCALIZATION FOR CLOUD-NATIVE APPLICATIONS

BACKGROUND

The present application generally relates to information technology and, more particularly, to issue management techniques. More specifically, anomaly detection is concerned with identifying potential problems and/or abnormal events in a set of events, and fault localization is concerned with narrowing a set of potential causes of an already-detected problem.

SUMMARY

In one embodiment of the present invention, techniques for fault localization for cloud-native applications are provided. An exemplary computer-implemented method can include classifying an event-related alert directed to at least one system by processing one or more characteristics of the event-related alert, and obtaining and processing multiple application logs based at least in part on the classification of the event-related alert. The method also includes identifying error logs among the multiple application logs based at least in part on the processing of the multiple application logs, ordering the error logs using one or more prioritization techniques, and performing at least one automated action based at least in part on the ordering of the error logs.

Another embodiment of the invention or elements thereof can be implemented in the form of a computer program product tangibly embodying computer readable instructions which, when implemented, cause a computer to carry out a plurality of method steps, as described herein. Furthermore, another embodiment of the invention or elements thereof can be implemented in the form of a system including a memory and at least one processor that is coupled to the memory and configured to perform noted method steps. Yet further, another embodiment of the invention or elements thereof can be implemented in the form of means for carrying out the method steps described herein, or elements thereof; the means can include hardware module(s) or a combination of hardware and software modules, wherein the software modules are stored in a tangible computer-readable storage medium (or multiple such media).

These and other objects, features and advantages of the present invention will become apparent from the following detailed description of illustrative embodiments thereof, which is to be read in connection with the accompanying drawings.

DETAILED DESCRIPTION

As described herein, an embodiment of the present invention includes fault localization for cloud-native applications. At least one embodiment includes providing fault localization for cloud native and hybrid applications by using at least one topological sort of run-time service invocation graph to isolate potential faults. Such an embodiment also includes narrowing potential causes of at least one already-detected problem by performing log analysis to distinguish between error-related behaviors and normal behaviors in the same temporal interval by monitoring logs for given time windows and using error distribution across an invocation chain to narrow an error message.

One or more embodiments also include inferring one or more components within at least one microservice by extracting entities mentioned in at least one log message, and identifying the component(s) in the at least one microservice which is causing an error. Additionally or alternatively, at least one embodiment includes analyzing various communications to determine an order in which requests reach a component, as well as processing logs over a given period of time to infer the request flow using graph isomorphism. Further, one or more embodiments can include identifying services and/or users impacted due to at least one faulty component by identifying and/or analyzing the impact(s) of the at least one fault.

Figure 1:
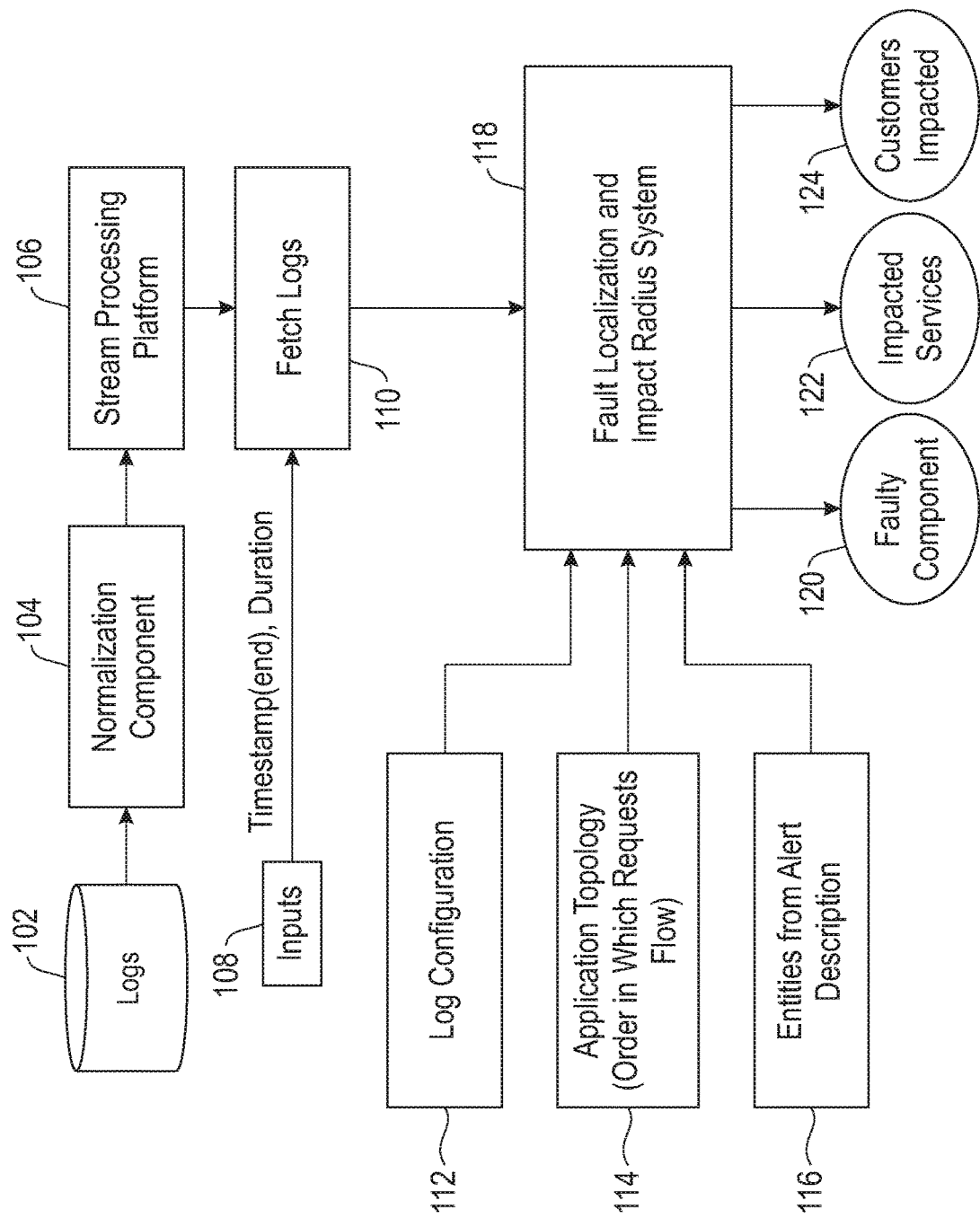
FIG. 1 is a diagram illustrating system architecture, according to an exemplary embodiment of the invention.

FIG. 1 is a diagram illustrating system architecture, according to an embodiment of the invention. As depicted in FIG. 1, raw logs 102 are received from connectors such as, for example, logDNA, elastic search, etc. Then, the logs 102 are normalized via component 104 (for example, via a logstash component and/or via identifying what various fields in corresponding JavaScript Object Notation (JSON) refer to, such as which field indicates time, which field refers to application and/or service name, etc., and modifying the data in such fields with respect to formatting and/or scale such that the data can be used in a consistent manner in subsequent analyses), and sent to a stream processing platform 106. Whenever an alert occurs, for example, via input 108, the duration of the alert and the exact time of the alert are extracted, and using these details, particular logs are fetched from the stream processing platform 106 in step 110. In one or more embodiments, an alert is set by an application developer or site reliability engineer (SRE) to monitor the state of a system. When an error and/or issue occurs, an alarm is raised by the system. Additionally, logs are generated at the same time when an alert is raised, describe related and/or relevant information to the error and/or issue corresponding to the alert.

Additionally, as also depicted in FIG. 1, log configuration information 112 is used by fault localization and impact radius system 118 to determine the fields which represent a time stamp, and one or more services which represent golden signal errors and a status code. Application topology information 114 (which can include the order in which requests flow) is also sent as input to the fault localization and impact radius system 118. In at least one embodiment, such input can also be inferred using logs. Also serving as input to fault localization and impact radius system 118 is information pertaining to relevant entities 116 extracted from the alert description. Based at least in part on inputs 112, 114 and 116, the fault localization and impact radius system 118 determines at least one fault component 120, one or more impacted services 122, and one or more impacted customers 124, wherein such determinations can be made, for example, via inferring one or more relationships across the input data. By way of illustration, in at least one embodiment, such inferred relationships can be determined by extracting entities mentioned in the processed log data corresponding to the error and/or issue, analyzing the relevant application topology information to determine an order in which requests reach one or more components within the application and/or service which were and/or can be affected by the error and/or issue, and correlating the extracted and/or analyzed data across the noted sources.

Figure 2:
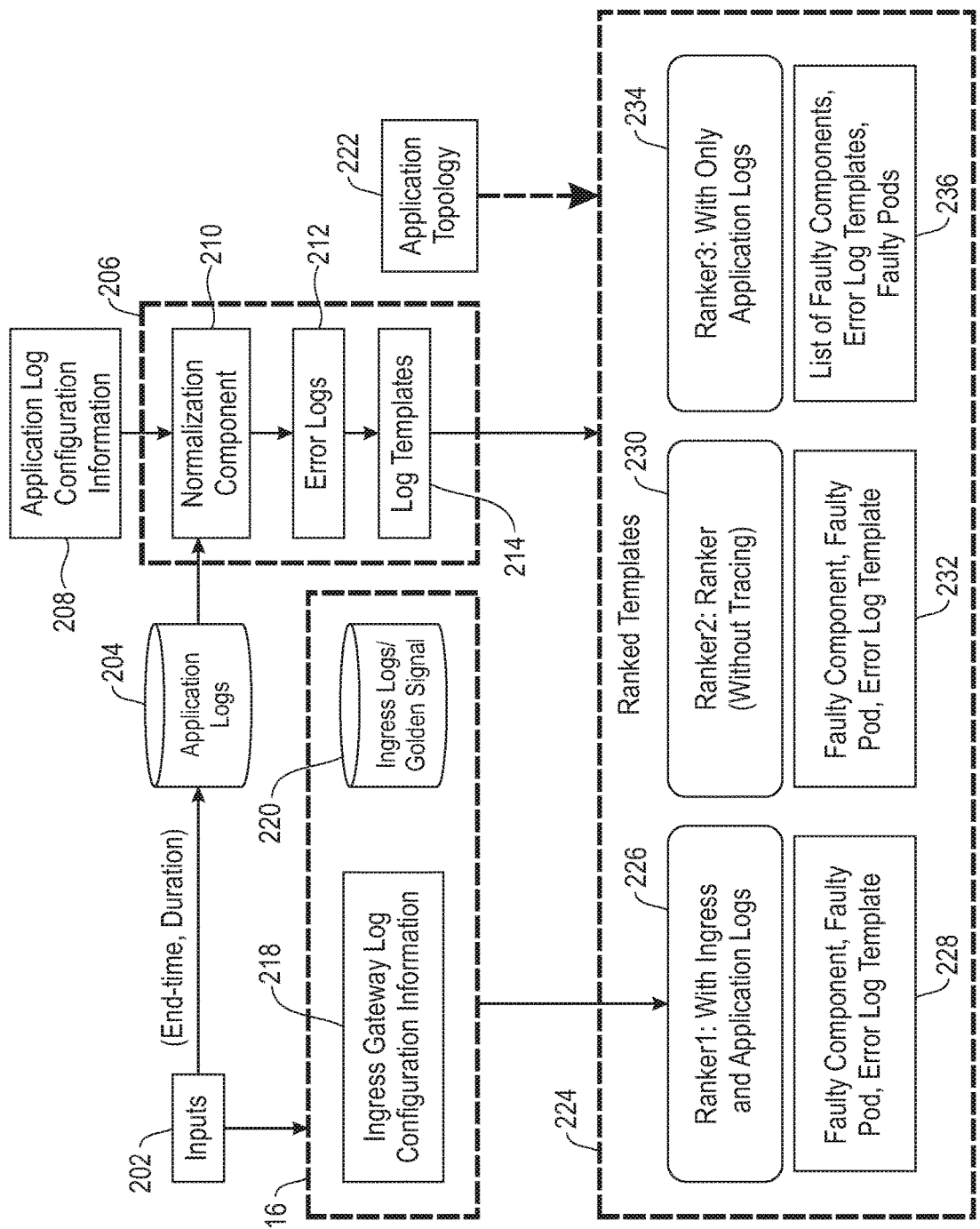
FIG. 2 is a diagram illustrating system architecture, according to an exemplary embodiment of the invention.

FIG. 2 is a diagram illustrating system architecture, according to an exemplary embodiment of the invention. By way of illustration, FIG. 2 depicts monitoring of application logs 204 (for example, as soon as the logs are generated in connection with inputs 202). Using component 206, these application logs 204 are normalized via component 210 (similar to the normalization techniques detailed above in connection with FIG. 1), and error logs 212 are extracted and converted, using application log configuration information 208 (e.g., information that captures and/or describes application logs), to log templates 214. In at least one embodiment, ingress logs and/or a golden signal 220 (e.g., gateway logs) and ingress gateway log configuration information 218 (e.g., information that captures and/or describes ingress gateway logs) are extracted via component 216.

As also depicted in FIG. 2, the first ranker 226 (among the collection of ranked templates 224) uses application topology information 222 as well as tracing information to determine at least one faulty component, faulty pod, and/or error log template 228. In at least one embodiment, tracing information can be present in one or more logs, and such an embodiment can include developing and implementing one or more log parsers to extract such information and use it in one or more analyses (e.g., comparative analyses with historical data) to make the noted determinations. With respect to the second ranker 230, tracing information is not used but an error distribution among various services is correlated in connection with determining at least one faulty component, faulty pod, and/or error log template 232. With respect to the third ranker 234, golden signal errors are not used, but by finding a deviation between the runtime application logs and historical (e.g., healthy logs) logs, a list of faulty components, faulty pods, and/or error log templates 236 is inferred.

Accordingly, at least one embodiment includes using a topological sort of run-time service invocation graph to isolate that potential faults are common yet with one or more differences. Such differences can include, for example, that a primary error signal is an alert based on a golden signal from a user-facing service in the application. As used herein, a golden signal error refers to the primary error signal based on which the alerts are raised. Also, golden signal errors record the number of times a request failed in the system. If there are more than a given number of requests failing in a certain time window, then an alert is raised. The threshold value of how many error signals are observed in the system can be configured. Additionally, such differences can include, for example, that each error signal is a composite of several failing service request responses, that an alerting service may also return successful responses to at least some user requests in a same time period, and that upstream services may not necessarily raise an alert.

As also detailed herein, one or more embodiments include leveraging error log events from upstream microservices to surface faulty components, and filtering out non-transactional-related error signals. In such an embodiment, faults can be in the log delta between failing and successful service requests, and a weighted topological sort for identifying faulty components can include, for example, <Microservice, Pod, Error Message>. Approaches to group error log events from upstream services can include, for instance, an approach based on transaction traceability and an approach based on temporal proximity to failing service requests. As used herein, a faulty component refers to a component with a given number (e.g., a number exceeding a given threshold) of transaction errors.

Figure 3:
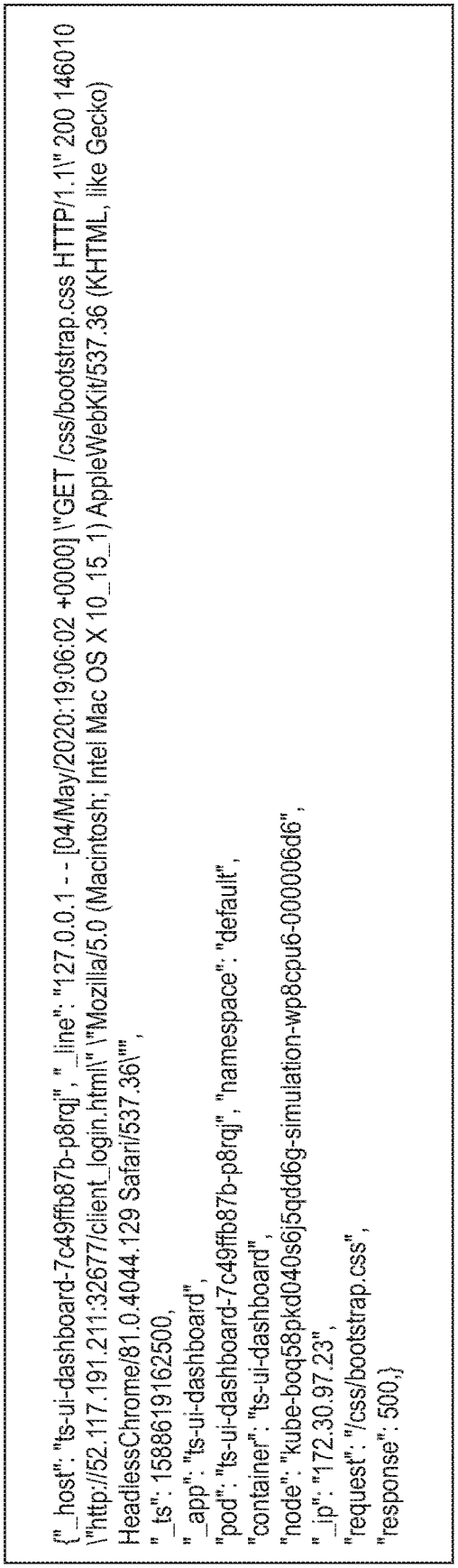
FIG. 3 is an example code snippet for initiating ingress logs as fields of interest, according to an exemplary embodiment of the invention.

FIG. 3 is an example code snippet for initiating ingress logs as fields of interest, according to an exemplary embodiment of the invention. In this example embodiment, code snippet 300 is executed by or under the control of at least one processing system and/or device. Also, the example code snippet 300 illustrates a sample of ingress and/or gateway logs. From the noted timestamp, request_id and_status information are extracted to localize the fault.

It is to be appreciated that this particular example code snippet shows just one example implementation of initiating ingress logs as fields of interest, and one or more alternative implementations of such techniques can be used in other embodiments.

Figure 4:
FIG. 4 is an example code snippet for initiating application logs as fields of interest, according to an exemplary embodiment of the invention.

FIG. 4 is an example code snippet for initiating application logs as fields of interest, according to an exemplary embodiment of the invention. In this example embodiment, code snippet 400 is executed by or under the control of at least one processing system and/or device. Also, the example code snippet 400 illustrates a sample of application logs, wherein the field container indicates from which service the error signal is emitted at time "@timestamp."

It is to be appreciated that this particular example code snippet shows just one example implementation of initiating application logs as fields of interest, and one or more alternative implementations of such techniques can be used in other embodiments.

At least one embodiment includes template ranking by error contribution, which can be carried out, for example, using a frequency based approach. Such an approach includes considering the runtime contribution and historical contribution of a template, wherein templates with a higher difference in the runtime and offline contribution are ranked higher. For example, consider a use case wherein template T1 has occurred 5% of the time historically and 20% at runtime (i.e., the difference is 15%), whereas template T2 has occurred 10% of the time historically and 12% at runtime (i.e., the difference is 2%). Accordingly, in such an example use case, template T1 will be ranked higher than T2.

Figure 5:
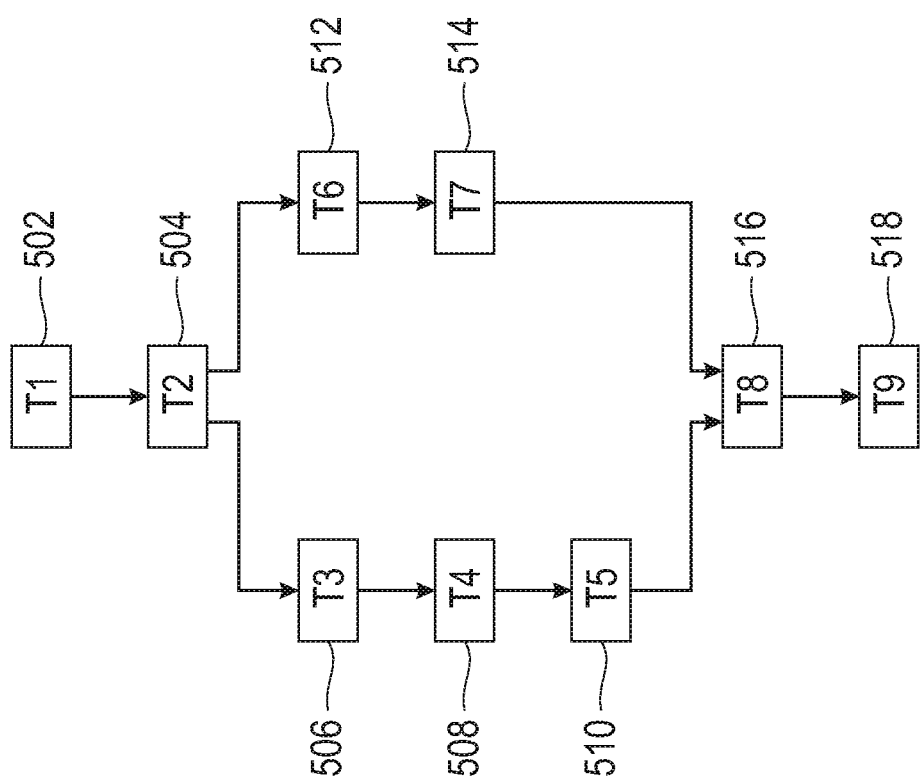
FIG. 5 is a diagram illustrating inferring an execution behavior model from log data, according to an exemplary embodiment of the invention.

FIG. 5 is a diagram illustrating inferring an execution behavior model from log data, according to an exemplary embodiment of the invention. By way of illustration, FIG. 5 depicts nodes 502, 504, 506, 508, 510, 512, 514, 516, and 518, wherein each node represents a template (e.g., a log message type corresponding to a print statement in code) and wherein each edge connects adjacent templates in a flow path. More specifically, FIG. 5 depicts the execution behavior of a service in a healthy state. Each template (502, 504, 506, 508, 510, 512, 514, 516, and 518) represents a print statement in the logs, and the edge between two templates, such as T3 and T4, for example, indicates that first T3 is executed and then T4 is executed. This information is generated from the logs and is used as application topology by one or more embodiments to localize faults.

As further detailed herein, at least one embodiment includes inferring service topology, wherein service topology with a software stack can be obtained from one or more application performance management (APM) tools. Additionally or alternatively, at least one embodiment includes log and/or template ranking by fault localization. Such an embodiment can include utilizing approximate service failure alert timespan information (e.g., for comparing error and normal log messages), as well as leveraging available service knowledge (e.g., using service failure condition(s) to identify error-related behavior versus normal behavior, using log transaction identifiers (IDs), using component-level error log message conditions (including obtaining all error templates for an incident), and/or using at least one dynamic service component workflow).

Consider an example use case, wherein an alert arrives. At least one embodiment can include extracting the time window and duration of the alert, and for the given time window, obtaining application logs. The output of such an embodiment includes a list of faulty and impacted components, the error template at each component, and a list of pods. As used herein, pods refer to entities in which the service is hosted. In at least one embodiment, it is possible that the same service is hosted in multiple pods, and one or more embodiments include identifies which pod(s) is faulty.

Consider another example use case, wherein an alert arrives. At least one embodiment can include extracting the time window and duration of the alert, and for the given time window, obtaining application and ingress logs. The output of such an embodiment includes fault localization information, including identification of at least one faulty component, an error template, and a list of pods. Such an output can also include identification of impacted components, error templates for each of the impacted component, and a list of pods on which the components are running.

Consider yet another example use case, wherein an alert arrives. At least one embodiment can include extracting the time window and duration of the alert, as well as the identities of the entities present in the alert description (such as, for example, slot information), and for the given time window, obtaining application and ingress logs. The output of such an embodiment includes fault localization information, including identification of at least one faulty component, an error template, and a list of pods. Such an output can also include identification of impacted components, error templates for each of the impacted component, and a list of pods on which the components are running.

As further detailed herein, one or more embodiments include utilizing service failure condition information to identify error-related behavior versus normal behavior. Using ingress logs, such an embodiment can include creating a list of two request_IDs; for example, one wherein the status is 200 and another wherein the status is greater than or equal to 500. Also, using application logs, such an embodiment includes obtaining the error templates for an incident.

Also, one or more embodiments include log co-relation, wherein a request_id in ingress logs is the same as a transaction_id in application logs. Such an embodiment can further include using the above information to classify the error templates into multiple portions; for example, one portion directed to error templates associated with a status of greater than or equal to 500 only, another portion directed to error templates associated with a status of both 200 and greater than or equal to 500, and yet another portion directed to error templates associated with a status of 200. In such an example embodiment, templates associated with a status of only 500 (and above) are the discriminative templates for a given incident, and hence ranker higher.

One or more such embodiments can include using the component call flow to rank the templates within each portion, wherein the component getting hit in the end emits its error log first and is the key error. It is possible that one microservice is emitting multiple error messages, and in such a scenario, at least one embodiment includes narrowing down to the exact error message (also referred to herein as the key error message) which is the root cause of the fault. Also, such embodiments can also include using a combination of component rank and runtime frequency of a template (e.g., the number of times a log line occurs) to rank the errors at runtime.

Figure 6:
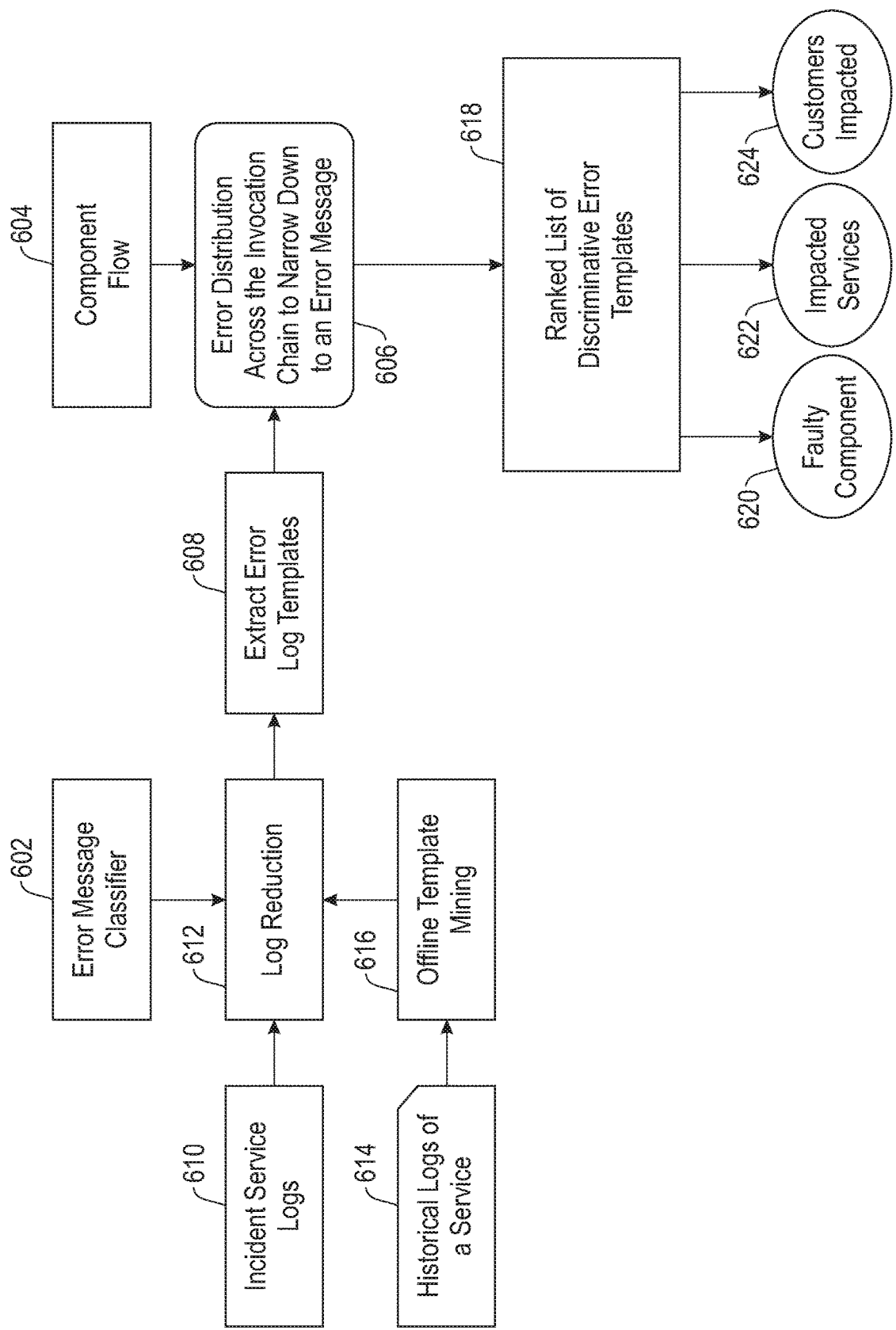
FIG. 6 is a diagram illustrating a workflow for identifying discriminative error log templates for a given incident, according to an exemplary embodiment of the invention.

FIG. 6 is a diagram illustrating a workflow for identifying discriminative error log templates for a given incident, according to an exemplary embodiment of the invention. FIG. 6 is similar to FIG. 1 and FIG. 2, but with additional details pertaining to how log templates 608 are generated. For example, application logs and/or incident service logs 610 are reduced via component 612 (e.g., via using one or more templatization-based techniques which facilitate clustering similar log lines) into templates 608 using error message classifier information 602 and by learning and implementing a model via analyzing historical logs 614 and performing offline template mining 616. Based on the templates 608 and a component flow 604, an error distribution across the invocation chain 606 is determined (e.g., via determining the error log frequencies for each relevant micro-services and correlating the errors which have approximately the same distribution) to narrow down to at least one error message. Based at least in part on this determination, a ranked list of discriminative error templates 618 is generated and used to determine at least one faulty component 620, one or more impacted services 622, and one or more impacted customers 624.

Figure 7:
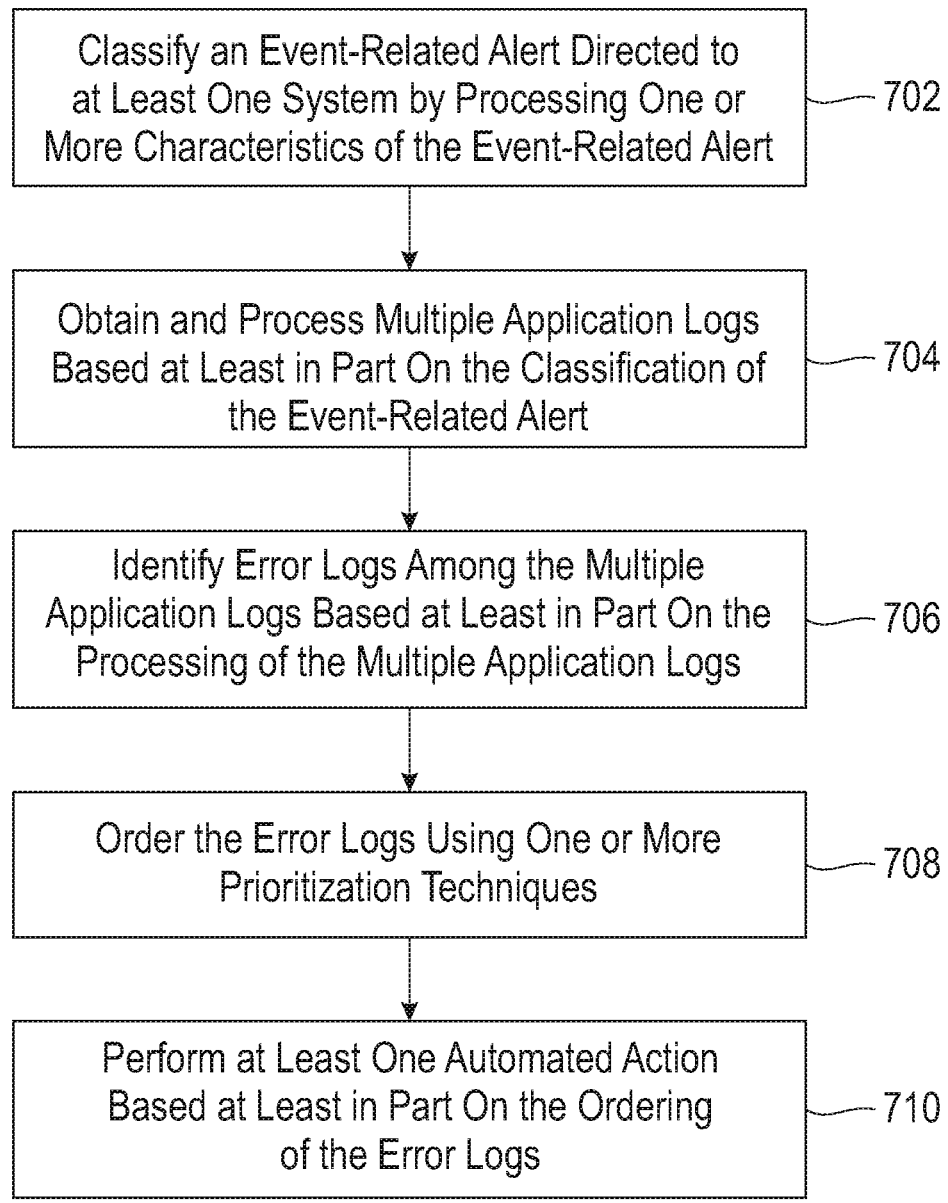
FIG. 7 is a flow diagram illustrating techniques according to an embodiment of the invention.

FIG. 7 is a flow diagram illustrating techniques according to an embodiment of the present invention. Step 702 includes classifying an event-related alert directed to at least one system by processing one or more characteristics of the event-related alert. In at least one embodiment, processing one or more characteristics of the event-related alert includes processing temporal information pertaining to at least duration of the event-related alert.

Step 704 includes obtaining and processing multiple application logs based at least in part on the classification of the event-related alert. In at least one embodiment, obtaining multiple application logs comprises obtaining one or more error logs and/or obtaining one or more ingress logs. In such an embodiment, processing multiple application logs includes converting at least a portion of the one or more error logs to one or more templates.

Step 706 includes identifying error logs among the multiple application logs based at least in part on the processing of the multiple application logs. In at least one embodiment, identifying the error logs includes implementing one or more tracing techniques and/or extracting error messages from the multiple application logs based on one or more error frequencies.

Step 708 includes ordering the error logs using one or more prioritization techniques. In at least one embodiment, ordering the error logs using one or more prioritization techniques includes ordering the error templates using application topology, ordering the error logs based on error distribution, and/or extracting one or more entities from the alert description and one or more log messages.

Step 710 includes performing at least one automated action based at least in part on the ordering of the error logs. In at least one embodiment, performing at least one automated action includes determining one or more impacted services based at least in part on the ordering of the error logs. Additionally or alternatively, performing the at least one automated action can include restarting at least one pod upon an indication, based at least in part on the ordering of the error logs and pod identification information derived from at least a portion of the error logs, that the at least one pod is not functional.

Also, one or more embodiments can include implementing the techniques depicted in FIG. 7 provided as a service in a cloud environment.

The techniques depicted in FIG. 7 can also, as described herein, include providing a system, wherein the system includes distinct software modules, each of the distinct software modules being embodied on a tangible computer-readable recordable storage medium. All of the modules (or any subset thereof) can be on the same medium, or each can be on a different medium, for example. The modules can include any or all of the components shown in the figures and/or described herein. In an embodiment of the invention, the modules can run, for example, on a hardware processor. The method steps can then be carried out using the distinct software modules of the system, as described above, executing on a hardware processor. Further, a computer program product can include a tangible computer-readable recordable storage medium with code adapted to be executed to carry out at least one method step described herein, including the provision of the system with the distinct software modules.

Additionally, the techniques depicted in FIG. 7 can be implemented via a computer program product that can include computer useable program code that is stored in a computer readable storage medium in a data processing system, and wherein the computer useable program code was downloaded over a network from a remote data processing system. Also, in an embodiment of the invention, the computer program product can include computer useable program code that is stored in a computer readable storage medium in a server data processing system, and wherein the computer useable program code is downloaded over a network to a remote data processing system for use in a computer readable storage medium with the remote system.

An embodiment of the invention or elements thereof can be implemented in the form of an apparatus including a memory and at least one processor that is coupled to the memory and configured to perform exemplary method steps.

Figure 8:
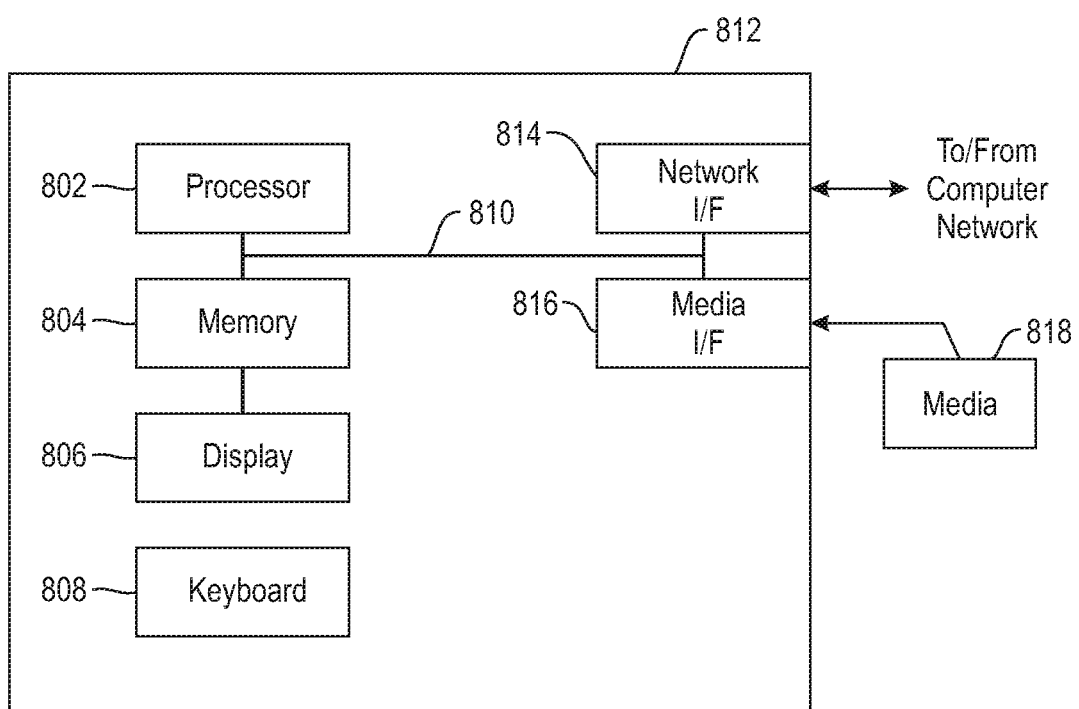
FIG. 8 is a system diagram of an exemplary computer system on which at least one embodiment of the invention can be implemented.

Additionally, an embodiment of the present invention can make use of software running on a computer or workstation. With reference to FIG. 8, such an implementation might employ, for example, a processor 802, a memory 804, and an input/output interface formed, for example, by a display 806 and a keyboard 808. The term "processor" as used herein is intended to include any processing device, such as, for example, one that includes a CPU (central processing unit) and/or other forms of processing circuitry. Further, the term "processor" may refer to more than one individual processor. The term "memory" is intended to include memory associated with a processor or CPU, such as, for example, RAM (random access memory), ROM (read only memory), a fixed memory device (for example, hard drive), a removable memory device (for example, diskette), a flash memory and the like. In addition, the phrase "input/output interface" as used herein, is intended to include, for example, a mechanism for inputting data to the processing unit (for example, mouse), and a mechanism for providing results associated with the processing unit (for example, printer). The processor 802, memory 804, and input/output interface such as display 806 and keyboard 808 can be interconnected, for example, via bus 810 as part of a data processing unit 812. Suitable interconnections, for example via bus 810, can also be provided to a network interface 814, such as a network card, which can be provided to interface with a computer network, and to a media interface 816, such as a diskette or CD-ROM drive, which can be provided to interface with media 818.

Accordingly, computer software including instructions or code for performing the methodologies of the invention, as described herein, may be stored in associated memory devices (for example, ROM, fixed or removable memory) and, when ready to be utilized, loaded in part or in whole (for example, into RAM) and implemented by a CPU. Such software could include, but is not limited to, firmware, resident software, microcode, and the like.

A data processing system suitable for storing and/or executing program code will include at least one processor 802 coupled directly or indirectly to memory elements 804 through a system bus 810. The memory elements can include local memory employed during actual implementation of the program code, bulk storage, and cache memories which provide temporary storage of at least some program code in order to reduce the number of times code must be retrieved from bulk storage during implementation.

Input/output or I/O devices (including, but not limited to, keyboards 808, displays 806, pointing devices, and the like) can be coupled to the system either directly (such as via bus 810) or through intervening I/O controllers (omitted for clarity).

Network adapters such as network interface 814 may also be coupled to the system to enable the data processing system to become coupled to other data processing systems or remote printers or storage devices through intervening private or public networks. Modems, cable modems and Ethernet cards are just a few of the currently available types of network adapters.

As used herein, including the claims, a "server" includes a physical data processing system (for example, system 812 as shown in FIG. 8) running a server program. It will be understood that such a physical server may or may not include a display and keyboard.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It should be noted that any of the methods described herein can include an additional step of providing a system comprising distinct software modules embodied on a computer readable storage medium; the modules can include, for example, any or all of the components detailed herein. The method steps can then be carried out using the distinct software modules and/or sub-modules of the system, as described above, executing on a hardware processor 802. Further, a computer program product can include a computer-readable storage medium with code adapted to be implemented to carry out at least one method step described herein, including the provision of the system with the distinct software modules.

In any case, it should be understood that the components illustrated herein may be implemented in various forms of hardware, software, or combinations thereof, for example, application specific integrated circuit(s) (ASICS), functional circuitry, an appropriately programmed digital computer with associated memory, and the like. Given the teachings of the invention provided herein, one of ordinary skill in the related art will be able to contemplate other implementations of the components of the invention.

Additionally, it is understood in advance that implementation of the teachings recited herein are not limited to a particular computing environment. Rather, embodiments of the present invention are capable of being implemented in conjunction with any type of computing environment now known or later developed.

For example, cloud computing is a model of service delivery for enabling convenient, on-demand network access to a shared pool of configurable computing resources (for example, networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as Follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (for example, country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (for example, storage, processing, bandwidth, and active user accounts). Resource usage can be monitored, controlled, and reported providing transparency for both the provider and consumer of the utilized service.

Service Models are as Follows:

Software as a Service (SaaS): the capability provided to the consumer is to use the provider's applications running on a cloud infrastructure. The applications are accessible from various client devices through a thin client interface such as a web browser (for example, web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (for example, host firewalls).

Deployment Models are as Follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (for example, mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (for example, cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 9:
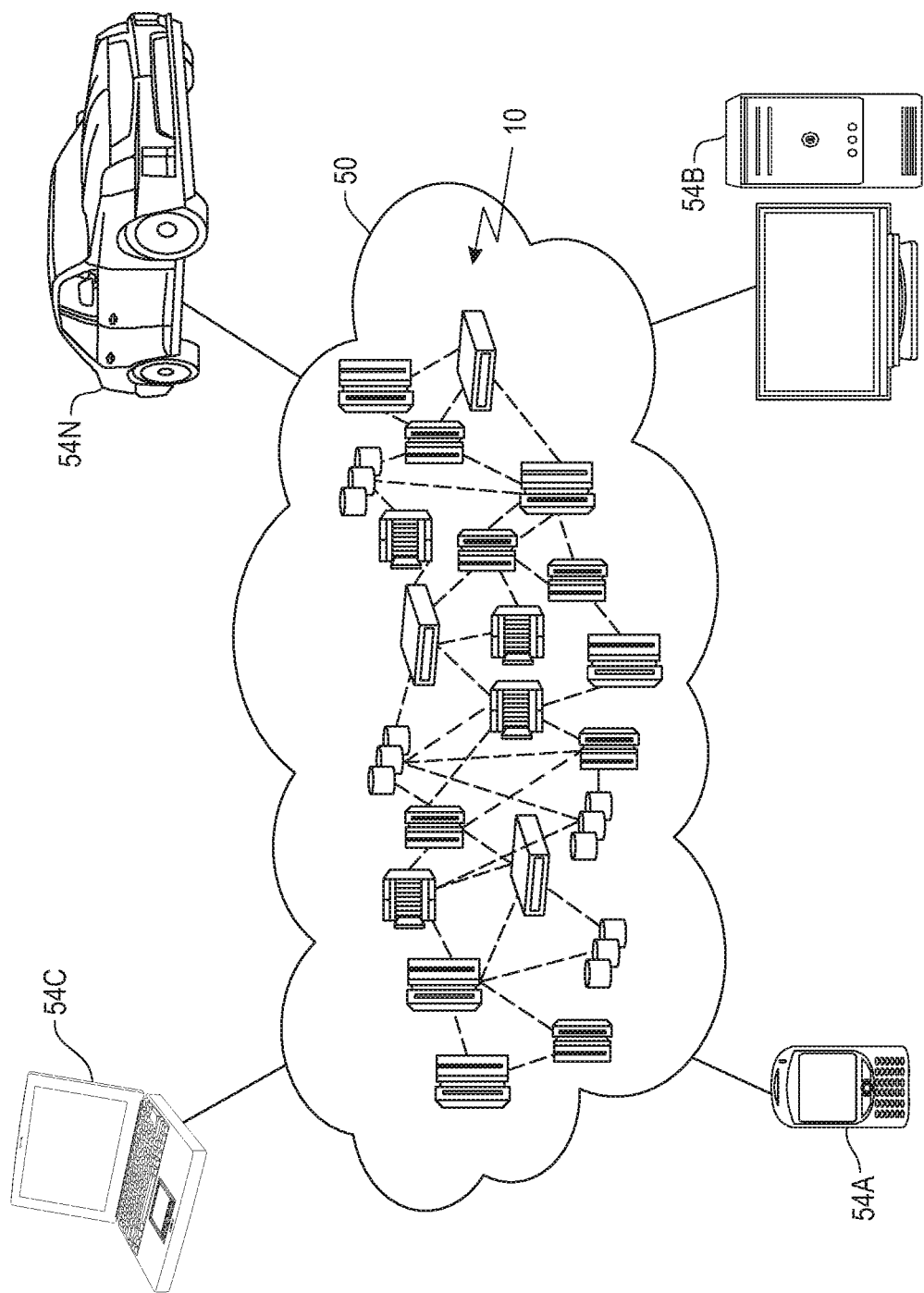
FIG. 9 depicts a cloud computing environment according to an embodiment of the present invention.

Referring now to FIG. 9, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 9 are intended to be illustrative only and that computing nodes 10 and cloud computing environment 50 can communicate with any type of computerized device over any type of network and/or network addressable connection (e.g., using a web browser).

Figure 10:
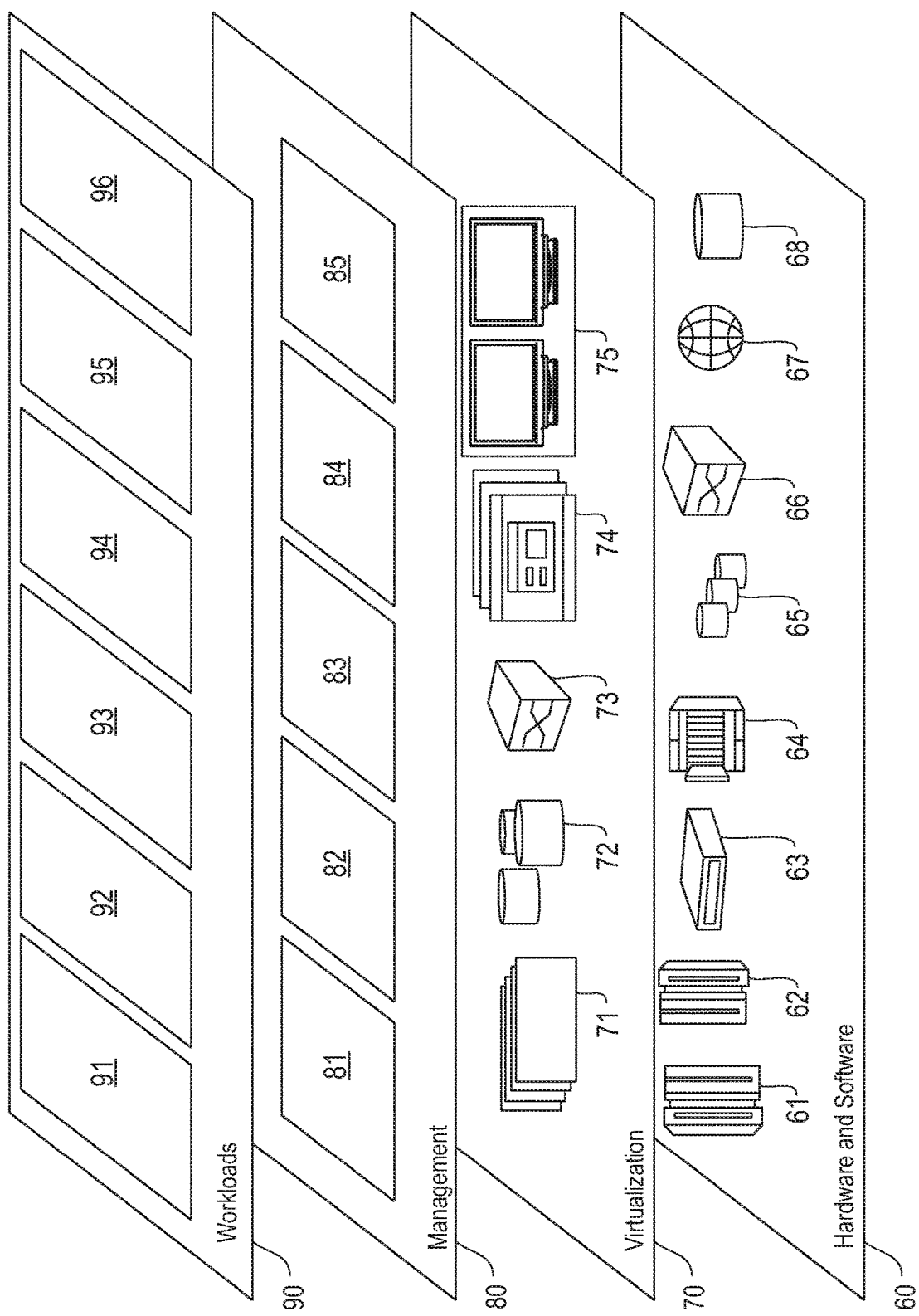
FIG. 10 depicts abstraction model layers according to an embodiment of the present invention.

Referring now to FIG. 10, a set of functional abstraction layers provided by cloud computing environment 50 (FIG. 9) is shown. It should be understood in advance that the components, layers, and functions shown in FIG. 10 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75. In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources.

In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and fault localization 96, in accordance with the one or more embodiments of the present invention.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, steps, operations, elements, and/or components, but do not preclude the presence or addition of another feature, step, operation, element, component, and/or group thereof.

At least one embodiment of the present invention may provide a beneficial effect such as, for example, providing fault localization for cloud-native and hybrid applications using topological sorting of run-time service invocation graphs to isolate potential faults.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method comprising:
   classifying an event-related alert directed to at least one system by processing one or more characteristics of the event-related alert;
   obtaining and processing multiple application logs based at least in part on the classification of the event-related alert;
   identifying error logs among the multiple application logs based at least in part on the processing of the multiple application logs;
   converting at least a portion of the error logs to error log templates by clustering similar log lines from the error logs using one or more templatization-based techniques;
   ranking the error log templates based at least in part on differences between runtime contributions of the error log templates and historical contributions of the error log templates;
   ordering the error logs using at least a portion of the ranked error log templates and one or more prioritization techniques comprising using at least one topological sort of run-time service invocation graph; and
   performing at least one automated action based at least in part on the ordering of the error logs;
   wherein the method is carried out by at least one computing device.

2. The computer-implemented method of claim 1, wherein said processing one or more characteristics of the event-related alert comprises processing temporal information pertaining to at least duration of the event-related alert.

3. The computer-implemented method of claim 1, wherein said obtaining multiple application logs comprises obtaining one or more error logs.

4. The computer-implemented method of claim 1, wherein said obtaining multiple application logs comprises obtaining one or more ingress logs.

5. The computer-implemented method of claim 1, wherein ordering the error logs using one or more prioritization techniques comprises ordering the error logs based on error distribution.

6. The computer-implemented method of claim 1, wherein ordering the error logs using one or more prioritization techniques comprises extracting one or more entities from the alert description and one or more log messages.

7. The computer-implemented method of claim 1, wherein said identifying error logs comprises implementing one or more tracing techniques.

8. The computer-implemented method of claim 1, wherein said identifying error logs comprises extracting error messages from the multiple application logs based on one or more error frequencies.

9. The computer-implemented method of claim 1, wherein said performing at least one automated action comprises determining one or more impacted services based at least in part on the ordering of the error logs.

10. The computer-implemented method of claim 1, wherein performing the at least one automated action comprises restarting at least one pod upon an indication, based at least in part on the ordering of the error logs and pod identification information derived from at least a portion of the error logs, that the at least one pod is not functional.

11. The computer-implemented method of claim 1, wherein software implementing the method is provided as a service in a cloud environment.

12. A computer program product comprising a non-transitory computer readable storage medium having program instructions embodied therewith, the program instructions executable by a computing device to cause the computing device to:

classify an event-related alert directed to at least one system by processing one or more characteristics of the event-related alert;

obtain and process multiple application logs based at least in part on the classification of the event-related alert;

identify error logs among the multiple application logs based at least in part on the processing of the multiple application logs;

convert at least a portion of the error logs to error log templates by clustering similar log lines from the error logs using one or more templatization-based techniques;

rank the error log templates based at least in part on differences between runtime contributions of the error log templates and historical contributions of the error log templates;

order the error logs using at least a portion of the ranked error log templates and one or more prioritization techniques comprising using at least one topological sort of run-time service invocation graph; and perform at least one automated action based at least in part on the ordering of the error logs.

13. The computer program product of claim 12, wherein said processing one or more characteristics of the event-related alert comprises processing temporal information pertaining to at least duration of the event-related alert.

14. The computer program product of claim 12, wherein ordering the error logs using one or more prioritization techniques comprises ordering the error logs based on error distribution.

15. A system comprising:
a memory; and
at least one processor operably coupled to the memory and configured for:

classifying an event-related alert directed to at least one system by processing one or more characteristics of the event-related alert;

obtaining and processing multiple application logs based at least in part on the classification of the event-related alert;

identifying error logs among the multiple application logs based at least in part on the processing of the multiple application logs;

converting at least a portion of the error logs to error log templates by clustering similar log lines from the error logs using one or more templatization-based techniques;

ranking the error log templates based at least in part on differences between runtime contributions of the error log templates and historical contributions of the error log templates;

ordering the error logs using at least a portion of the ranked error log templates and one or more prioritization techniques comprising using at least one topological sort of run-time service invocation graph; and performing at least one automated action based at least in part on the ordering of the error logs.

16. The system of claim 15, wherein said processing one or more characteristics of the event-related alert comprises processing temporal information pertaining to at least duration of the event-related alert.

17. The system of claim 15, wherein ordering the error logs using one or more prioritization techniques comprises ordering the error logs based on error distribution.

* * * * *